Sept. 23, 1958 R. V. ROGERS 2,853,407

METHOD OF MAKING MAGNETIC RECORDING MEDIA

Filed Dec. 20, 1957

INVENTOR.
RUSSELL V. ROGERS

BY
Lippincott, Smith & Ralls
ATTORNEYS

United States Patent Office 2,853,407

Patented Sept. 23, 1958

2,853,407

METHOD OF MAKING MAGNETIC RECORDING MEDIA

Russell V. Rogers, San Jose, Calif., assignor to International Business Machines Corporation, New York, N. Y., a corporation of New York Application December 20, 1957, Serial No. 704,101

5 Claims. (Cl. 148—6.35)

Figure 1:
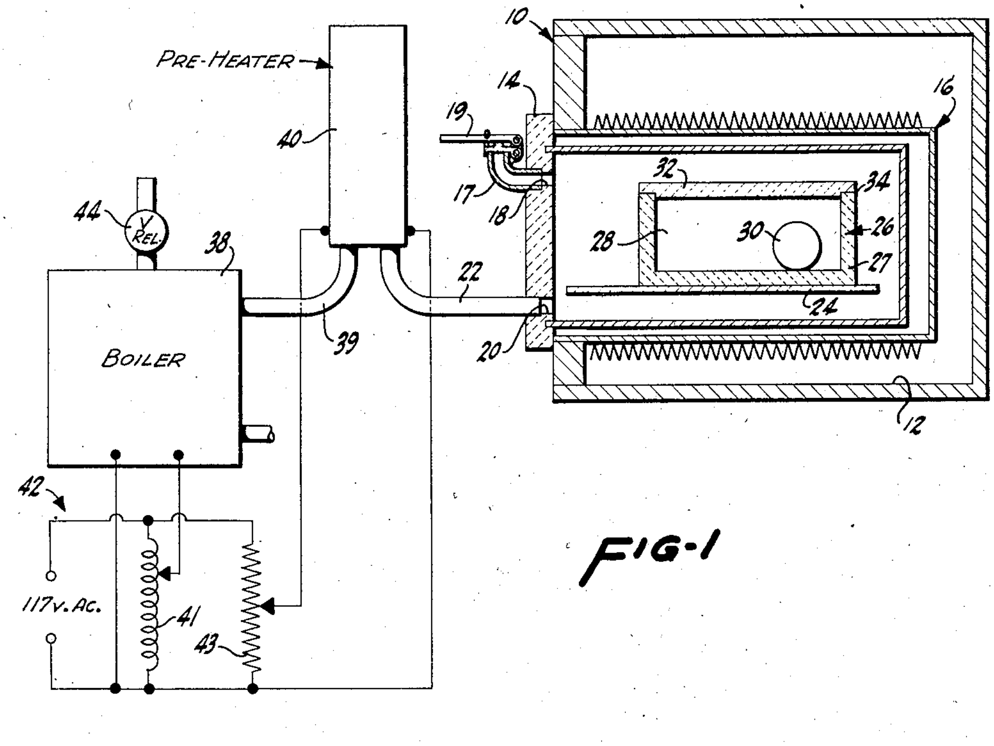

This invention relates to a process for producing a magnetic recording surface upon a ferrous object, and more particularly is directed to a process for forming an iron oxide surface having magnetic properties which can be utilized for storing information.

Conventionally magnetic recording surfaces are provided upon various magnetic recording media by coatings of magnetic paints containing gamma $Fe_2O_3$ or magnetite ($Fe_3O_4$) as with magnetic tapes and discs or by plating nickel-cobalt layers as with magnetic drums. The cost of providing magnetic surfaces in these ways is quite high and the difficulties encountered in coating or plating, particularly with regard to controlling the thickness and the uniformity of the magnetizable surface, are numerous and perplexing under commonly known techniques. Furthermore, none of these techniques lends itself to the provision of a suitable magnetic recording surface adapted to so-called perpendicular recording which demands a thin layer of magnetically retentive material superimposed upon a relatively thicker layer of highly permeable magnetic material having little or no retentive characteristics.

The present invention provides a very low cost process for securing a magnetic surface via oxidizing the outer layer or surface of a ferrous object such as disc, drum or tape to provide an iron oxide ($Fe_3O_4$) layers of easily controlled thickness and which is automatically superimposed upon a ferrous object having higher permeability and lower retentivity as required in perpendicular magnetic recording. Basically the present invention is an improvement in the process used for obtaining rust resistant films for the protection of tools and the like as shown in U. S. Patents 1,346,473; 2,236,728 and 2,727,842.

In applying the techniques of the known process to provide magnetic surfaces on recording bases, however, it was discovered that small pits would be present in the surface layer. These pits of a size in the order of .020" diameter or more constitute discontinuities in recording upon the magnetic surface because the bit densities now used in recording are such that an interruption in the continuity of the recording would occur as a recording head traverses the pits rendering the pitted magnetic surface unusable for the purpose intended.

After exhaustive investigation to determine the cause of the pits in the iron oxide surface layer, it was finally postulated that foreign or external substances would contaminate the ferrous recording base after it had been placed in the furnace for treatment. Filtering of the steam introduced into the furnace did not alleviate this condition. However, by modifying the known process and by enclosing the ferrous recording base with a porous refractory material, it was found that the resultant oxide layer was free of blemishes and pits which could affect its use as a memory surface and now would find ready acceptance in a recording medium.

This invention thus achieves the object of producing an acceptable magnetic surface for use as a memory surface in a recording base by embodying a process which includes surrounding the recording base of ferrous metal with a porous refractory material, placing the base so surrounded into a furnace, turning the furnace to a temperature above the temperature at which the red oxide of iron ($Fe_2O_3$) is formed while simultaneously introducing steam into the furnace so that the steam will penetrate the porous refractory material and provide an oxidizing agent whereby the surface of the ferrous base will be converted into a layer or film of magnetite ($Fe_3O_4$).

Figure 2:
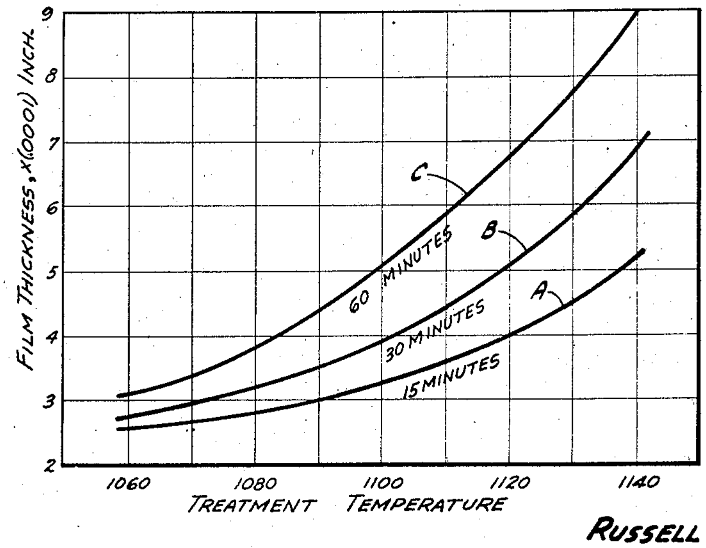

Other objects and advantages will become apparent from a consideration of the following detailed description, forming the specification, and taken in conjunction with the accompanying drawing wherein:

Fig. 1 shows one form of apparatus for carrying out the novel process embodying this invention; and Fig. 2 is a graph plotting the effect of temperature on the thickness of magnetite layer for different treatment intervals.

In order to provide recording bases of ferrous metal with an oxide layer of substantially pure black magnetic oxide, $Fe_3O_4$ or ferroso-ferric oxide, the apparatus as shown in Fig. 1 of the accompanying drawing is illustrated as one example in which the process may be carried out.

A furnace, generally indicated at 10, is shown as being of the electric type. However, it may be of any suitable construction and of any type which would perform the necessary heating operation. The furnace 10 has a heating chamber or compartment 12 which opens through one wall thereof and may be closed by a suitable cover or door 14.

The cover 14, in this instance, is actually the front cover of a retort, generally indicated at 16, which is receivable within the heating chamber 12. The cover 14 can be secured in place to close the open end of the retort while at the same time sealing the open end of the heating chamber 12 by extending thereacross. Through the door or cover 14 there is provided a pair of passages 18 and 20. Piping 17 has one end extending through passage 18 and carries on its other end a flapper valve 19 for controlling communication between the interior of the retort 16 and the atmosphere outside of the retort. A steam inlet pipe 22 is connected by suitable fittings to extend through the passage 20 to be in communication with the interior of the retort 15 when the cover or door 14 is placed across the open end of the retort.

Within the retort 16 there is a support platform 24 upon which may rest a casket or container, generally indicated at 26, of porous refractory material, such as insulating firebrick. The refractory material of which the casket or container 26 is made, should have sufficient heat resistance to the temperatures involved in the process and at the same time must be porous enough to permit the passage of steam therethrough during the entire process period. The container 26 has a body portion 27 provided with a hollow interior 28 and open top so that a recording base or work piece 30, of ferrous metal, or a plurality of such work pieces may be placed therein. The hollow interior or cavity 28 is closed by a cover 32 which is provided with a peripheral lip 34 resting upon the upper periphery of the cavitated body portion 27 so as to effectively close the container. Mating surfaces are lapped together to provide optimum seal.

A source of steam which may be a boiler 38, is connected into a preheater 40. The preheated or superheated steam emerges from the preheater through the pipe 22 into the interior of the retort 16. The operation of the boiler 38 and the preheater 40 is controlled by electrical means, generally indicated at 42. However, it will be appreciated that any means for controlling the operation of the boiler and the preheater may be used without departing from the concept of the present invention. In the illustrated apparatus, the boiler is controlled by a variable transformer 41 connected into a power source of electrical energy while the preheater may be controlled by a variable series of resistances 43 also connected into the source of electrical energy or power. Preferably, the boiler 38 is provided with a pressure relief means 44 which may be in the form of an open ended relief tube or a relief valve.

The work piece 30 may be in the form of a circular disc, a cylindrical drum or any other configuration which is used as a recording base upon which information is recorded by a magnetic recording head.

In the initial stages of the present process of the invention, the furnace is preheated to approximately 700° F. The work piece 30 is thoroughly cleaned with chlorothene or other equivalent solvent or cleaning agent. After cleaning, the work piece is placed in the refractory container, and the lid 32 of the container is positioned to close the open top of the body portion 27 so that the work piece 30 is, for all practical purposes, enclosed and surrounded by the refractory material of the container.

The work piece 30 enclosed within the refractory container 26 is put into the furnace retort 16 upon the shelf or support platform 24 in the interior of the retort. The door 14 is then secured across the open end of the retort, as by being bolted thereon, so as to completely seal the retort. The retort is then placed within the heating chamber or compartment 12 of the furnace. The door 14 closes the open end of the heating chamber. Preheater 40 is then connected into the retort through the pipe 20 and suitable connections therefor. Furnace temperature is then held at 700° F. for thirty minutes.

After approximately 25 minutes steam emerging from the boiler is connected into the preheater through suitable piping 39 to be acted upon by the preheater so that the superheated steam will be introduced into the interior of the retort 16. The furnace exhaust or flapper valve 19 is open during the initial period of steam introduction into the retort 26. This will purge the interior of the retort so than an atmosphere of steam is present within the retort and free oxygen in the sealed retort will be kept below a concentration (about 0.5%) which will cause formation of the undesirable red iron oxide, $Fe_2O_3$, which is loose and bulky and will not satisfactorily adhere to the surface of the work piece.

The furnace is then maintained at 700° F. for 30 minutes with the steam passing through the retort to effect the purging action.

The work piece of ferrous metal to be provided with a magnetic surface converted from the ferrous surface of the work piece, which is relatively free from red oxide of iron ($Fe_2O_3$), is heated in the range of from 1060° F. to 1140° F. in a steam atmosphere for a predetermined period of time so as to acquire a consistently uniform, tightly adherent layer of iron oxide comprising almost entirely $Fe_3O_4$. Thus, to accomplish the heat ranges indicated, the furnace is turned up to its maximum power, after the steam purge, with furnace flapper valve closed. Closing of flapper valve 19 will maintain a differential pressure in the retort of approximately 0.25 pound per square inch. At this time, also, the steam flow is reduced by adjusting the boiler output, and in the present case this may be done by adjusting the voltage through the variable transformer 41. The power input to the preheater 40 is adjusted through the series resistor 43 to maintain at 360° F. preheater temperature. This preheater temperature is maintained throughout the remainder of the process. Operation of a preheater in this process is, of course, peculiar to the type of furnace used. It would appear that the maximum preheater temperature possible would be desirable from the standpoint of furnace heat required to bring the steam up to furnace temperature. In other words, the higher the temperature of the steam entering the retort, the quicker the steam will be brought up to furnace temperature.

The furnace is heated so as to approach the predetermined temperature at which it will be held for a specified period of time. The times and temperatures to achieve the film or layer thicknesses desired are shown in the graph of Fig. 2 wherein it will be readily apparent that if the time is held constant, the thickness will vary with an increase in the temperature over the range of from 1060° F. to 1140° F. As the time interval is increased, as from the fifteen minutes of curve A, to 30 minutes represented by curve B, the film or layer thicknesses will be increased as indicated at any given temperature within the specified range. The curve line C indicates the relation of temperature to film or layer thickness when the treatment interval is 60 minutes.

It should be noted that while the work piece 30 is surrounded and enclosed within the refractory cask or container 26, that the material is not in intimate contact therewith except at the point where the work piece rests on the bottom of the cavity 28. In this instance the refractory material is of sufficient rigidity to maintain itself. However, if a refractory material such as ordinary sand, which has proven to be effective, is used provision must be made to keep the area of the work piece which will constitute the memory surface from intimate contact with the loose refractory material.

During the time the work piece is subjected to a selected temperature within the range specified, the work piece is continuously subjected to the oxidizing action of a steam atmosphere. The quantity of the steam generated is accurately controlled to give the desired character and depth of the oxide layer. As previously explained, the relationship between the temperature used, and the time during which the work piece is subjected to the oxidizing action while the work pieces are at such temperature, results in thicknesses of film as shown in the graph of Fig. 2. While the drawing illustrates, by way of example, the process being carried out in a single furnace, it will be readily apparent that this process may be effectively accomplished in continuous type furnaces, either chain operated or those operated by pusher mechanisms. One particular application of a continuous type furnace operation is in the processing of a magnetic tape to be used for recording purposes to provide a magnetic surface thereon to serve as a memory surface.

The process of this invention has been found to produce consistently uniform results when operated within the limits disclosed. The oxide layer or film of the desired thickness so produced, with from .0005 to .0009 inch being preferred, achieves a uniform surface which is free from imperfections and pits insuring the absence of discontinuities when the surface is used as a recording medium.

It has also been found that the work piece 30 may be removed from the furnace at the completion of the specified time at the required temperature without requiring a cooling period in the furnace or without requiring any particular atmosphere in which to be cooled to room temperature.

Although not essential, the oxidized surface converted from the surface of the ferrous metal work piece may be buffed to a high polish. Preferably the buffing operation should take place as close to the time of the use of the work piece as a recording medium as possible.

What is claimed is:

1. The process of treating a ferrous base to form thereon a smooth continuous magnetic surface which comprises surrounding said base with a porous refractory material, placing said base while so surrounded into a sealed chamber, heating said chamber to a temperature at which the base surface converts to a magnetic oxide in the presence of an oxidizing medium, and introducing steam into said chamber as it is being heated with the steam passing through the porous refractory material to said base providing the oxidizing medium necessary for the conversion of the surface of said base into a magnetic oxide.

2. The process of treating a ferrous base to form thereon a smooth continuous magnetic surface which comprises surrounding said base with a porous refractory material, placing said base while so surrounded into a sealed chamber, purging said chamber of free oxygen, heating said chamber to a process temperature at which the base surface converts to a magnetic oxide in the presence of an oxidizing medium, and introducing steam into said chamber as it is being heated and while it is held at said process temperature with the steam passing through the porous refractory material to said base providing the oxidizing medium necessary for the conversion of the surface of said base into a magnetic oxide.

3. The process of treating a ferrous recording base to form on the surface thereof a smooth continuous magnetic layer to provide a memory surface, said process comprising surrounding said base with a porous refractory material, placing said base while so enclosed into a sealed chamber, preheating said chamber at 700° F. for 30 minutes, establishing a steam atmosphere to purge said chamber of free oxygen for 30 minutes at 700° F., heating said chamber to a selected temperature in the range of about 1060° F. to 1140° in which temperature range the base surface to converts to a magnetic layer in the presence of an oxidizing medium, maintaining the selected temperature for a period of from 15 to 60 minutes, and simultaneously introducing steam into said chamber with the steam passing through said porous refractory material to said base providing the oxidizing medium necessary for the conversion of the surface of said base into a layer of magnetic oxide at the selected temperature.

4. The process of treating a ferrous base to form on the surface thereof a smooth continuous coating of magnetite which comprises enclosing said base with a filter, placing said base while so enclosed into a sealed chamber, purging said chamber of free oxygen by circulating a steam flow therethrough and permitting escape of the steam flow to atmosphere, heating said chamber for a given period of time at a selected temperature whereby the base surface converts to magnetite in the presence of an oxidizing medium, reducing the steam flow in said chamber and limiting its rate of escape to atmosphere during the time period said chamber is heated at the selected temperature with the steam passing through said filter to said base to provide the oxidizing medium necessary for the conversion of the surface of said base into a coating of magnetite.

5. The process of treating a ferrous recording base to form on the surface thereof a smooth continuous coating of magnetite to provide a memory surface, said process comprising surrounding said base with a filter of porous refractory material, placing said base while so surrounded into a sealed chamber, preheating said chamber, purging said chamber of free oxygen by circulting a flow of steam therethrough and permitting the escape of the steam flow to atmosphere, heating said chamber to a selected temperature between 1060° F. and 1140° F. for 15 to 60 minutes, and reducing the flow of steam while said chamber is rising to and being maintained at the selected temperature with the steam passing through said porous refractory material to said base to provide an oxidizing medium necessary to convert the surface of said base into a coating of magnetite at said selected temperature.

References Cited in the file of this patent

UNITED STATES PATENTS

| | | |
|---|---|---|
| 773,368 | Bower et al. | Oct. 25, 1904 |
| 2,236,728 | Given | Apr. 1, 1941 |
| 2,768,916 | Seabold et al. | Oct. 30, 1956 |